United States Patent
Choi

(10) Patent No.: US 7,695,006 B2
(45) Date of Patent: Apr. 13, 2010

(54) PASSENGER AIRBAG DEVICE WITHOUT HOUSING

(75) Inventor: Hyeongho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 107 days.

(21) Appl. No.: 11/965,407

(22) Filed: Dec. 27, 2007

(65) Prior Publication Data

US 2009/0127831 A1    May 21, 2009

(30) Foreign Application Priority Data

Nov. 15, 2007    (KR) .................... 10-2007-0116582

(51) Int. Cl.
*B60R 21/16* (2006.01)

(52) U.S. Cl. .................................... 280/732
(58) Field of Classification Search ............. 280/728.2, 280/728.3, 732, 752
See application file for complete search history.

(56) References Cited

U.S. PATENT DOCUMENTS

| 4,097,064 A | * | 6/1978 | Ikawa et al. ............... 280/732 |
| 4,911,471 A | * | 3/1990 | Hirabayashi ............... 280/732 |
| 5,072,967 A |  | 12/1991 | Batchelder et al. |
| 5,154,444 A | * | 10/1992 | Nelson ..................... 280/732 |
| 5,215,330 A | * | 6/1993 | Kurita ..................... 280/728.3 |
| 5,542,698 A | * | 8/1996 | Ichino et al. ............... 280/732 |
| 5,806,880 A | * | 9/1998 | Gray ....................... 280/728.3 |
| 5,992,876 A | * | 11/1999 | Gray ....................... 280/728.3 |

FOREIGN PATENT DOCUMENTS

| JP | 2005-35541 | 2/2005 |
| WO | WO 2005100104 | 10/2005 |

* cited by examiner

*Primary Examiner*—Paul N Dickson
*Assistant Examiner*—Robert A Coker
(74) *Attorney, Agent, or Firm*—Morgan, Lewis & Bockius LLP

(57) ABSTRACT

An airbag door is openably attached to an instrument panel. A cushion pad is attached inside the airbag door, and has a stepped separable pad. A cushion bracket is attached to the cushion pad. A cushion is mounted inside the cushion bracket. The cushion separates the separable pad and opens the airbag door upon inflation. A reinforcement member is attached to the cushion near a gas inflow hole in the cushion. An inflator assembly for inflating the cushion is connected to the cushion by a mounting bracket.

8 Claims, 3 Drawing Sheets

(a)

(b)

(a)

(b)

PASSENGER AIRBAG DEVICE WITHOUT HOUSING

CROSS-REFERENCE TO RELATED APPLICATIONS

The present application is based on, and claims priority from, Korean Application Serial Number 10-2007-0116582, filed on Nov. 15, 2007, the disclosure of which is hereby incorporated by reference herein in its entirety.

FIELD OF THE INVENTION

The present invention relates to a passenger side airbag device.

BACKGROUND OF THE INVENTION

A typical passenger side airbag provides an outlet through which the airbag unfolds, covered by a passenger airbag door (PAB door), inside the PAB door is a steel housing that houses the airbag cushion. An inflator and a diffuser that transmits the gas of the inflator into the cushion are also provided inside the PAB door. A mounting bracket supports the diffuser and housing.

Several laws have been enacted to prevent breaking of the windshield by tearing of the airbag cushion, and incomplete unfolding. Strict laws for airbag performance have also been enacted. For example, in the United States, the "Advanced Airbag Law" restricts the amount of damage on a passenger due to the inflating force of the airbag.

Because the typical airbag module includes so many components in such specific relationships with each other, cost of modifying, test, and design is high. Also, the typical structure is heavy: about 3.5 kg.

The above information disclosed in this Background section is only for enhancement of understanding of the background of the invention and therefore it may contain information that does not form the prior art that is already known in this country to a person of ordinary skill in the art.

SUMMARY OF THE INVENTION

An airbag device is disclosed. An airbag door is openably attached to an instrument panel. A cushion pad is attached inside the airbag door, and has a stepped separable pad. A cushion bracket is attached to the cushion pad. A cushion is mounted inside the cushion bracket. The cushion separates the separable pad and opens the airbag door upon inflation. A reinforcement member is attached to the cushion near a gas inflow hole in the cushion. An inflator assembly for inflating the cushion is connected to the cushion by a mounting bracket.

The reinforcement member may be made of fabric or plastic, and may have a hole corresponding to the gas inflow hole of the cushion, such that the inflator inflates the cushion through the hole in the reinforcing member.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Hereinafter, embodiments of the invention are described in detail with the accompanying drawings. Some embodiments are disclosed for illustrative purposes, and those skilled in the art will appreciate that various modifications, additions and substitutions are possible. Therefore, the invention is not limited thereto.

Figure 1:
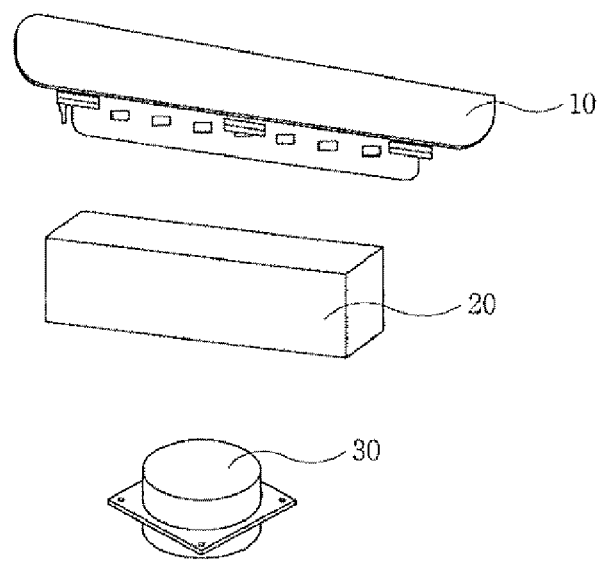
FIGS. 1A and 1B illustrate an airbag device according to an embodiment of the invention.
Figure 1:
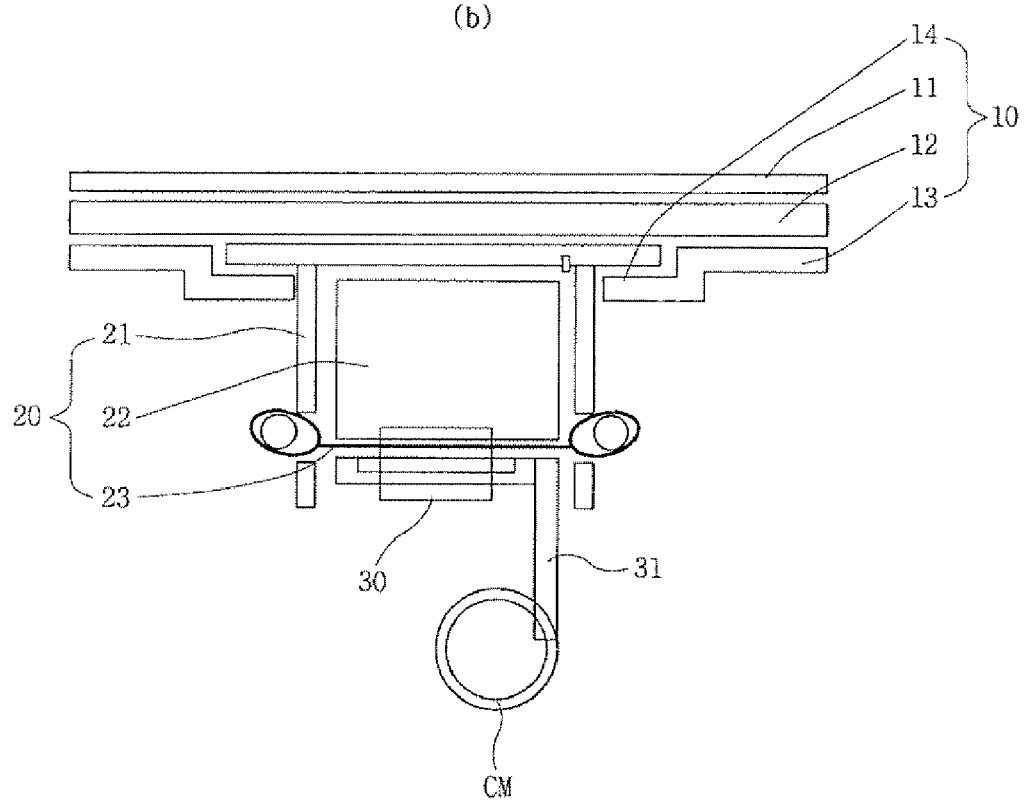

Referring to FIGS. 1A and 1B, an airbag device includes a passenger airbag door assembly 10 that is removably attached to an instrument panel (not shown), a cushion assembly 20 inside the instrument panel, including a cushion 22, and an inflator assembly 30 that is connected with cushion assembly 20 above a cowl cross member CM, and that includes an inflator to provide gas into cushion 22.

Figure 3:
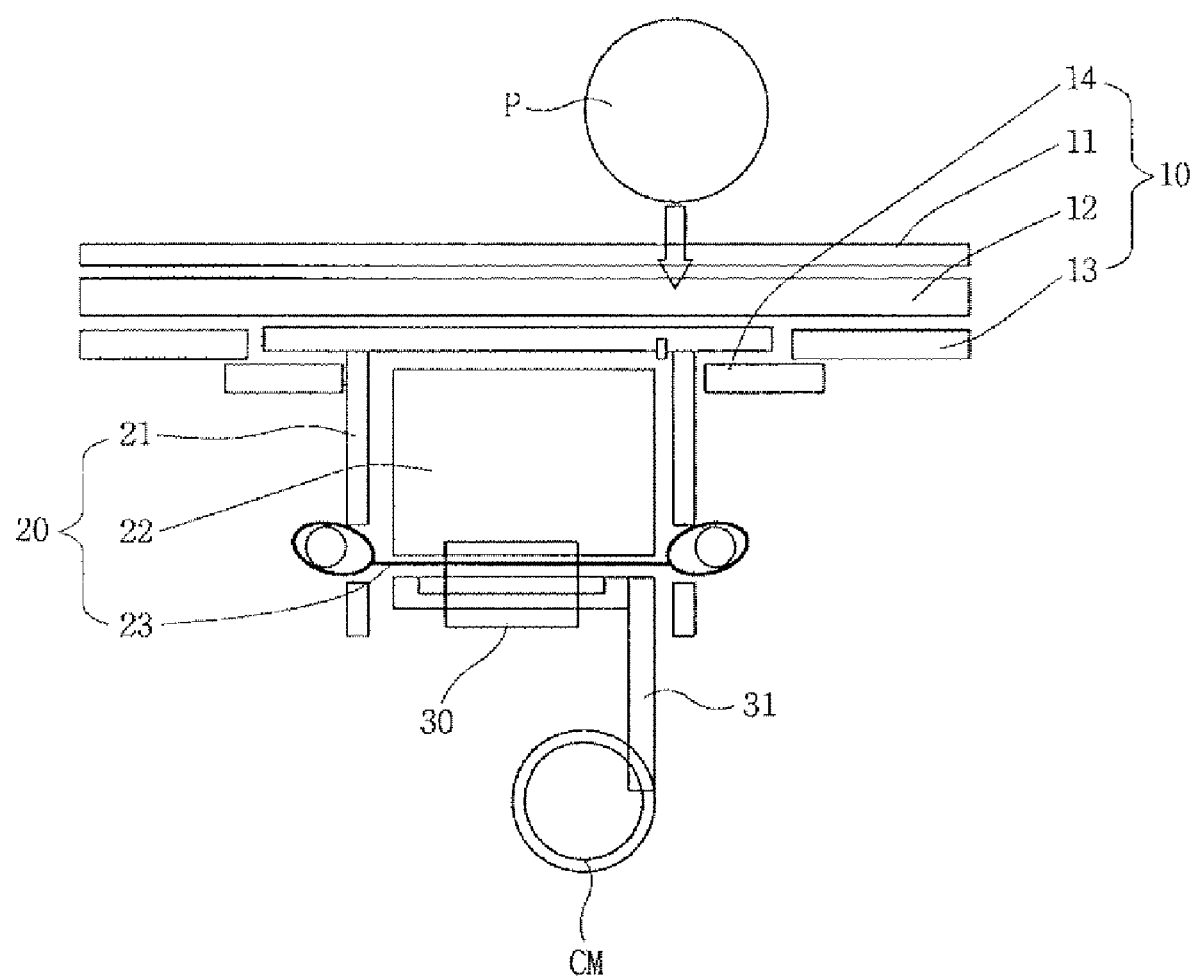
FIG. 3 illustrates shock applied to the head by an airbag device according to an embodiment of the invention.

Passenger airbag door assembly 10 includes a cushion pad 13 covering a filler 12 attached to the inside of passenger airbag door 11 constituting the outer wall, and a stepped separable pad 14 is provided at the side of cushion pad 13 where cushion assembly 20 is received. Accordingly, as shown in FIG. 3, when shock is applied, separable pad 14 absorbs and reduces the shock while separating from cushion pad 13.

Further, cushion assembly 20 includes cushion 22 received in a cushion bracket 21 disposed inside passenger airbag door 11, and a reinforcement member 23 attached around a gas inflow hole in cushion 22, that supports cushion 22.

Figure 2:
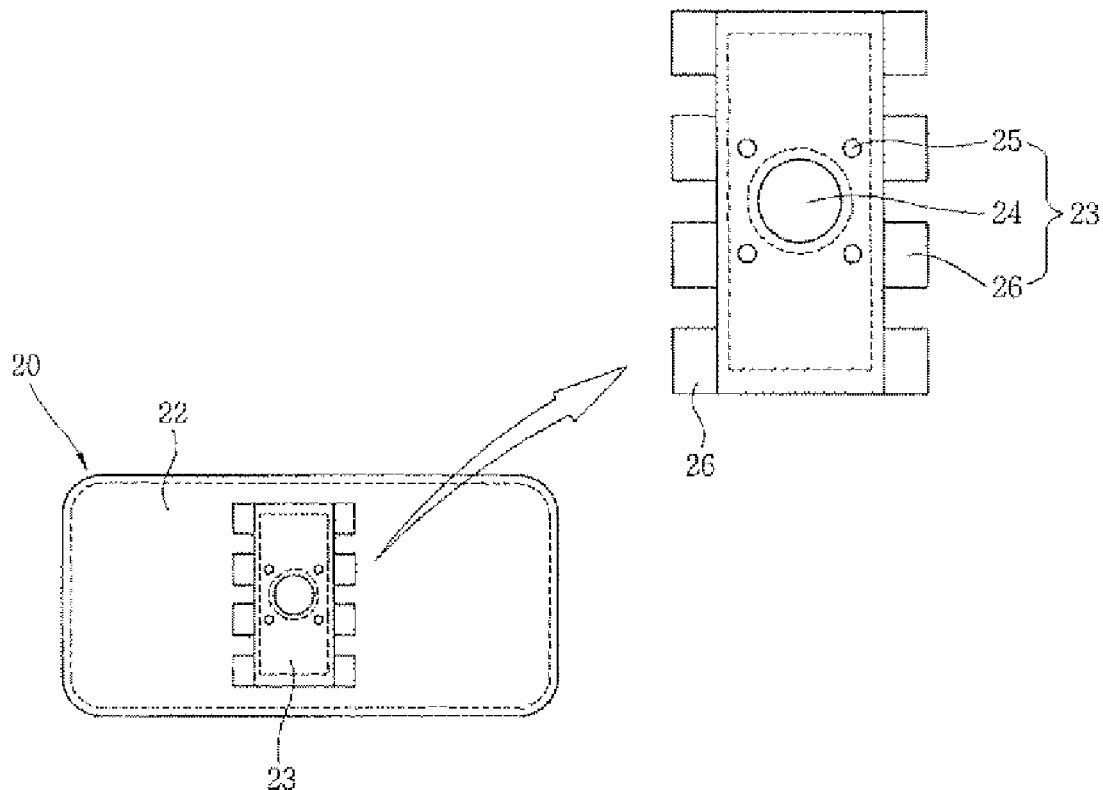
FIGS. 2A and 2B illustrate an airbag cushion according to an embodiment of the invention.
Figure 2:
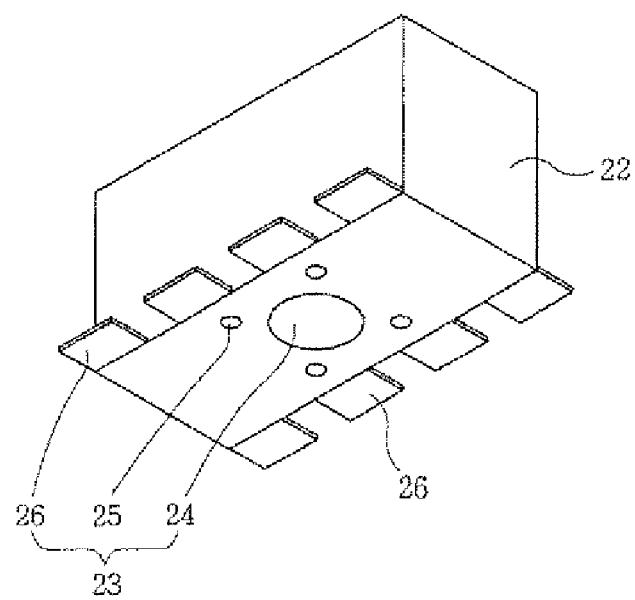

Reinforcement member 23 may be made of fabric or a thin plastic, and may be sewn to cushion 22. In addition, as shown in FIG. 2A, fixing portions 26 are provided at both sides of cushion 22, and are attached by locking portions on the airbag. A large main hole 24 on reinforcement member 23 functions as a gas inlet, through which gas from the inflator 30 flows into cushion 22. In addition, a plurality of sub holes 25 are provided around main hole 24 through which bolts fasten cushion 22 to the inflator 30.

Inflator assembly 30 includes a mounting bracket 31 to connect to cushion assembly 20 above cowl cross member CM, and an inflator to introduce gas into cushion 22.

As described above, in the passenger airbag device according to an embodiment of the invention, a separate steel housing is not used and cushion 22 is supported by a lightweight reinforcement member 23. Therefore, in addition to reducing the weight of the airbag device and the number of involved components fastened to each other, it is possible to absorb and reduce shock applied to a passenger P using separable pad 14 that is provided to cushion pad 13 inside passenger airbag door 11 and separated by the shock, when the head of the passenger P hits passenger airbag door 11.

Cushion bracket 21 receiving cushion 22 is disposed around cushion pad 13 with stepped separable pad 14 inside passenger airbag door 11, such that cushion bracket 21 does not contact and support the lower portion of passenger airbag door 11.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An airbag device, comprising:
   an airbag door configured to be openably attached to an instrument panel;
   a cushion pad attached inside the airbag door and comprising a stepped separable pad provided at a side of the cushion pad;
   a cushion bracket coupled to the cushion pad and supported by the stepped separable pad such that when a shock beyond a predetermined amount of force is applied to the airbag door, the stepped separable pad is separated from the cushion pad to absorb the shock;
   a cushion mounted inside the cushion bracket, and configured to open the airbag door upon inflation;
   a reinforcement member attached to the cushion near a gas inflow hole in the cushion and coupled to the cushion bracket; and
   an inflator assembly that is connected to the cushion through the reinforcement member and fixed to a cowl cross member by a mounting bracket, and configured to inflate the cushion.

2. The airbag device as defined in claim 1, wherein the reinforcement member comprises fabric.

3. The airbag device as defined in claim 1, wherein the reinforcement member comprises plastic.

4. The airbag device as defined in claim 1, wherein the reinforcement member comprises a hole corresponding to the gas inflow hole of the cushion such that the inflator inflates the cushion through the hole in the reinforcing member.

5. The airbag device as defined in claim 1, wherein the reinforcement member comprises fabric having a shape of flexible sheet.

6. The airbag device as defined in claim 1, wherein the reinforcement member comprises plastic having a shape of flexible sheet.

7. The airbag device as defined in claim 1, wherein the reinforcement member comprises a hole corresponding to the gas inflow hole of the cushion such that the inflator inflates the cushion through the hole in the reinforcing member and fixing portion (26) formed at both sides and not sewn to the cushion, wherein, the fixing portions have closed loop shape sections inserted by a pin to support the cushion to the cushion bracket.

8. An airbag device, comprising:
   an airbag door configured to be openably attached to an instrument panel;
   a cushion pad attached inside the airbag door and comprising a stepped separable pad provided at a side of the cushion pad;
   a cushion bracket (21) coupled to the cushion pad and supported by the stepped separable pad such that when a shock beyond a predetermined amount of force is applied to the airbag door, the stepped separable pad is separated from the cushion pad to absorb the shock;
   a cushion (22) mounted inside the cushion bracket and configured to open the airbag door upon inflation;
   a reinforcement member (23) attached to the cushion near a gas inflow hole in the cushion; and
   an inflator assembly (30) that is connected to the cushion through the reinforcement member and fixed to a cowl cross member (CM) via a mounting bracket (31),
   wherein the reinforcement member supports the cushion bracket, allowing the relative motion of the cushion bracket against the inflator assembly supported by the cowl cross member via the mounting bracket.

* * * * *